Patented Dec. 7, 1926.

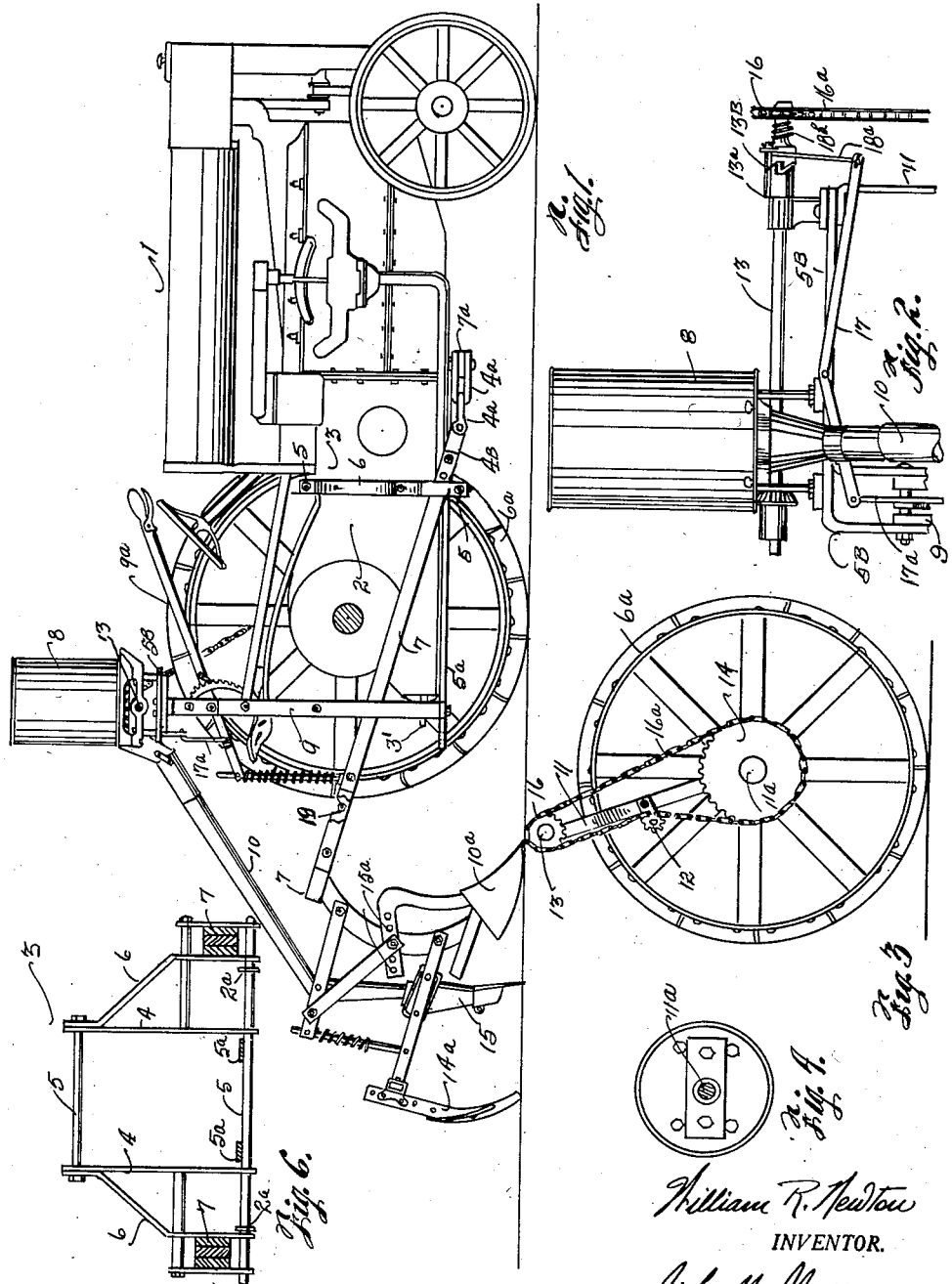

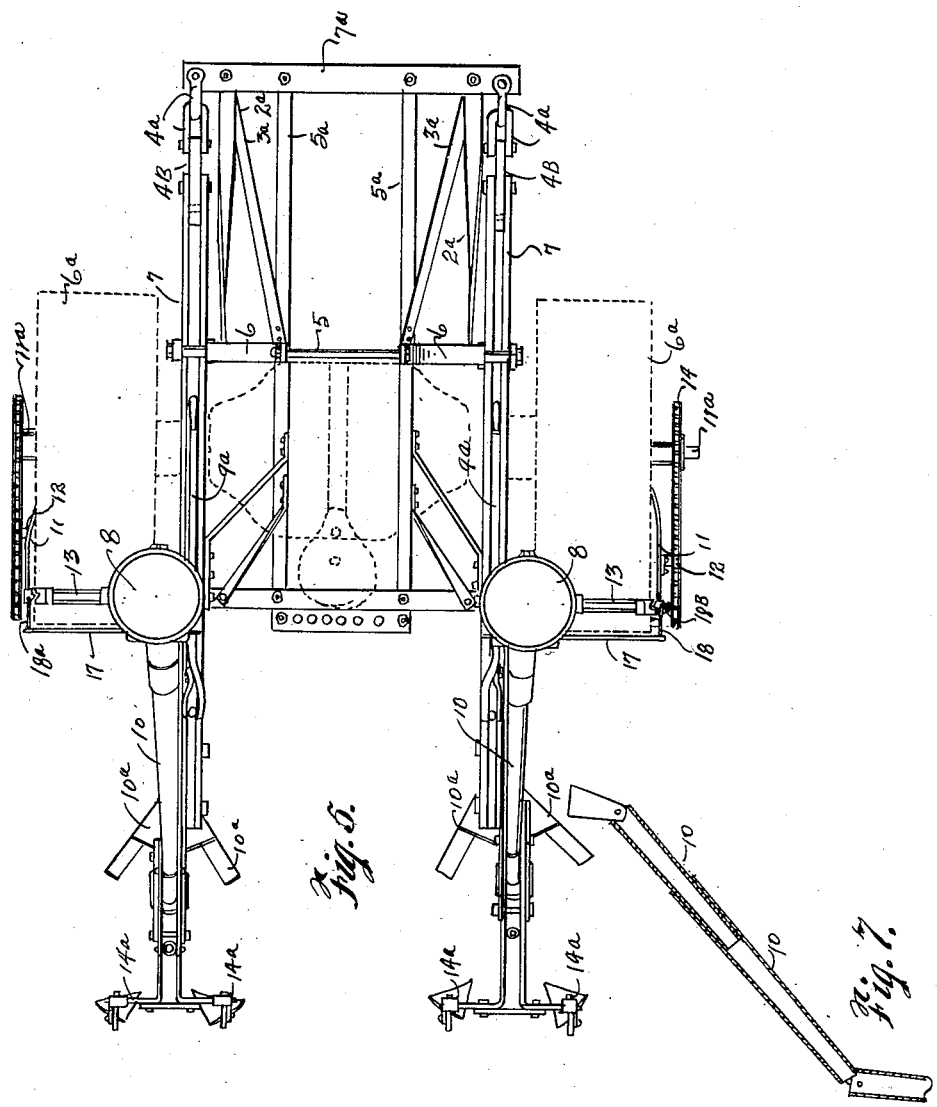

1,609,630

UNITED STATES PATENT OFFICE.

WILLIAM R. NEWTON, OF HILLSBORO, TEXAS.

PLANTER ATTACHMENT FOR TRACTORS.

Application filed August 18, 1924. Serial No. 732,607.

This invention relates to tractors and refers more particularly to improvements in planter attachments therefor, the primary object being to provide a modern farming implement of this character, by the use of which more acreage may be covered in a shorter space of time with better results than heretofore.

Another object of the invention resides in the provision of a planter attachment which will readily be attached to this particular type of tractor in a minimum of time, by the use of very few nuts, bolts and other means of attachment.

Also the provision of a planter attachment of economical, durable and substantial build, with facilities provided for the proper adjustment of its few working parts.

A feature of the invention resides in the telescopically arranged seed depositing tube, providing a means of extension thereof during the operation of the machine.

The above objects, features and advantages are attained by the mechanism as set forth in the following description and illustrated in the supplemented drawings, wherein:

Figure 1 represents a side elevational view of a tractor showing the invention in attachment thereto portion being in section.

Figure 2 represents a detail view of the seed container and operating mechanism.

Figure 3 represents a side elevational view of a tractor rear wheel, showing the means of operating the planter attachment.

Figure 4 is a detail view of the hub, illustrating the method of securing the main drive sprocket thereto.

Figure 5 represents a plan view of the attachment, showing the arrangement of the various braces and the general construction thereof.

Figure 6 represents a detail front end view of the front frame illustrating its relation to adjacent parts.

Figure 7 is a cross-sectional view of the seed depositing tube, illustrating the telescopic arrangement thereof.

In the course of the following detailed description, similar characters of reference are used to indicate the various operating principles of the invention also the new and novel features contained therein, wherein; 1 denotes a tractor, around the transmission housing 2 of which is bolted or otherwise suitably secured a frame or brace 3. This brace comprises a pair of perpendicular bars 4—4, oppositely disposed on each side of the transmission housing and is braced thereon by transverse rods 5—5. The lower of these rods extends across the machine beneath the tractor engine and acts as an auxiliary brace for the plow beams 7—7.

As added braces, a pair of obliquely inclined bars 6—6 are employed in connection with the complete brace 3. The lower portion of these bars provide the necessary support and movement limiting means for the two beams 7—7. This brace 3 is illustrated in detail in Figure 6.

In order that a more comprehensive idea of the invention may be gained, attention is drawn to Figure 6 of the drawings, wherein is shown the preferred form of the attachment of the device to a tractor. A transverse bar 7ª extends across beneath the tractor engine, to the ends of which are secured the beams 7—7. At the point of attachment of the beams, a pair of oppositely disposed links or clevises 4ª—4ª are employed in order that a universal connection may be provided. Interposed between the two bars comprising the beams 7—7, and engaged by the clevis 4ª, is an extension or link 4ᵇ, to provide suitable adjusting means for the extension of said beams. Secured at their forward ends to the bar 7ª are the longitudinally extending brace bars 2ª and 5ª, these bars being connected to the lower transverse rod 5 of the frame 3 as clearly illustrated in Figure 6. Also positioned between the frame 3 and the bar 7ª are diagonally extending brace bars 3ª secured at their forward ends to the member 7ª and at their rear extremities to the medial portion of the bars 5ª. Attached to the rear ends of the bars 5ª and to the tractor tongue or hitch 3' is the medial portion of a rear frame or brace including vertical supporting members 9 as clearly illustrated in Figures 1 and 5.

The seed containers 8—8 are conveniently situated on each side of the driver's seat, slightly above the rear wheels 6ª of the tractor, as illustrated in Figure 1, upon an extension 5ᵇ from the vertical supporting member 9—9. This latter member provides the necessary support for the beam lifting levers 9ª.

From each of the seed containers 8—8 are suspended seed depositing tubes 10—10.

These tubes extend at an angle toward the ground and terminate at a point directly behind the plow share 10ª. It will be observed, upon referring to Figure 7 of the drawings, that these members are formed, one within the other on the order of a telescope, to provide the necessary retraction and extension of these members upon the uneven tread of the plows in the ground, and upon the raising and lowering of the beams 7—7.

Referring to Figure 2 of the drawings, the container 8 is shown supported upon the extensions 5ᵇ, part of which is broken away. This support extends out over the rear wheel of the tractor, and to the end of which is secured a brace 11, see Figure 3. The opposite end of this brace 11 is substantially secured to the extension bar 11ª, to which latter bar is secured the main drive sprocket wheel 14. The brace 11 also provides a means for supporting the chain extension sprocket 12.

A shaft 13, extending out over the wheels of the tractor, has one end connected to the mechanism of the container 8 (said mechanism not shown), the opposite end being provided with a simple clutch mechanism 13ª, which mechanism will be described later in the operation of the device.

The planter attachment, illustrated in Figure 1, consists of a combination of braces secured together in a novel manner, and is adapted to trail directly behind the tractor wheels, and as near to said wheels as is practicable, in order that the operator may plant the seed as near the border of the field as possible and close to the corners thereof. The trailer plows 14ª are adapted to cover the seed when deposited by the lower portion 15 of the tube 10. It will be seen that the plow shares 10ª have holes 15ª to provide suitable adjustments for different depths.

In the operation of the planter seed containers 8—8, the necessary power is derived through the sprocket wheel 14, suitably secured to the extension shaft 11ª, as heretofore set forth. Over this sprocket 14 and another smaller sprocket wheel 16, situated upon the end of shaft 13, extends a chain 16ª, which mechanical arrangement operates the mechanism in the containers 8—8.

A centrally pivoted horizontal bar 17 extends across beneath these containers on a horizontal line with a shaft 13, shown in Figure 2. A link 17ª is secured to one end of this bar and a second link 18ª, one end of which is secured to the opposite end of the bar 17 and to an eye in the portion 13ᵇ of the clutch mechanism.

It will be seen that upon the lowering of the lever 9ª, the plows will be drawn from the ground. In this operation the link 17ª is pressed upwardly, lowering the opposite end of the centrally pivoted bar 17, thereby drawing the portion 13ᵇ of the clutch mechanism out of engagement with the portion 13ª thus releasing the shaft 13. The spring 18ᵇ assists in returning the portion 13ᵇ of the clutch mechanism into engagement with the portion 13ᵇ.

In Figure 1, at the end of the beams 7—7 is provided an automatic release in the form of a triangular groove 19, in order that should heavy objects, such as stones, stumps and the like, not visible on the surface of the ground be encountered, the attachment will reverse, preventing possible injury to the plow share 10ª, or to any of the braces constituting the planter attachment.

It is not desired that the invention be limited to the specific disclosure as herein described, and it should be understood that minor changes in the arrangement and construction of the invention may be resorted to as fall within the scope and meaning of what is herein claimed.

I claim:

1. An implement support and draft means for tractors comprising a front transverse bar arranged beneath the transmission casing of a tractor, a pair of rearwardly extending parallel bars having their forward ends secured to the intermediate portions of said front transverse bar and having their rear extremities interconnected, a pair of rearwardly inclined parallel implement draft means having their forward ends connected to the extremities of the front transverse bar, a relatively long transverse rod arranged rearwardly from said front bar, an upper relatively short transverse rod vertically aligned with said relatively long rod, vertical bars interconnecting said rods to form a transmission casing encircling frame, additional short rods vertically aligned with the relatively long transverse rod and terminating at the extremities of said long rod, angular arms interconnecting the outer end portions of said three rods, a relatively short vertical bar interconnecting the extremities of the two lower transverse rods to form guides for the implement draft beams, an upstanding portion arranged rearwardly of the transmission casing and mounted on the rear end portion of the first named rearwardly extending bars, and brace means for said upstanding portion.

2. The combination, with a vehicle, of implement and draft means comprising a front transverse bar, rearwardly-extending connected bars secured at their forward ends to said front transverse bar, rearwardly-inclined implement-draft members connected at their forward ends with said front transverse bar, a relatively long transverse rod disposed to the rear of said front bar, an upper relatively short transverse rod substantially perpendicular to said relatively long rod, vertical bars connecting said rods to form a frame, additional short rods substantially perpendicular to said relatively long transverse rod and terminating at the ends of said long rod, arms connecting the outer end portions of said three rods, a relatively short vertical bar connecting the two lower transverse rods to form guides for the implement draft means, and an upstanding portion mounted on the rear portion of the first-named rearwardly-extending bars.

In testimony whereof I have signed my name to this specification.

WILLIAM R. NEWTON.